Feb. 11, 1958 H. F. McKENNEY 2,822,694
SYSTEM FOR CONSTRAINING MASS OF GYRO WHEEL

Filed March 20, 1957 4 Sheets-Sheet 1

INVENTOR
H. F. McKenney
BY
ATTORNEY

Feb. 11, 1958  H. F. McKENNEY  2,822,694
SYSTEM FOR CONSTRAINING MASS OF GYRO WHEEL
Filed March 20, 1957  4 Sheets-Sheet 3

INVENTOR
H. F. McKenney

BY *Victor D. Borst*

ATTORNEY

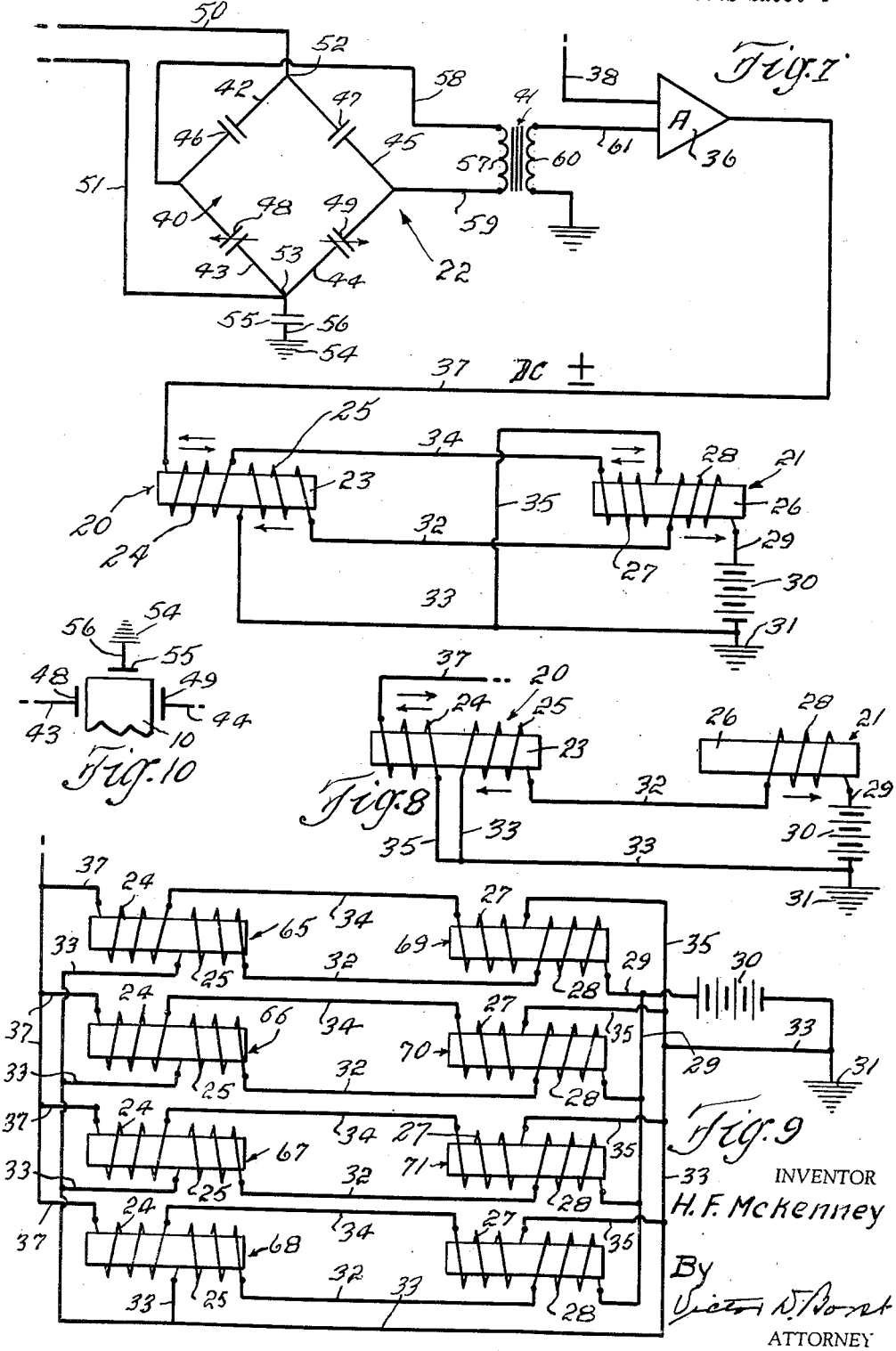

United States Patent Office 2,822,694
Patented Feb. 11, 1958

2,822,694

SYSTEM FOR CONSTRAINING MASS OF GYRO WHEEL

Henry F. McKenney, Weston, Mass., assignor to Sperry Rand Corporation, Ford Instrument Company Division, Long Island City, N. Y., a corporation of Delaware Application March 20, 1957, Serial No. 647,401

17 Claims. (Cl. 74—5)

This invention relates generally to gyroscopes, and more specifically to means for automatically maintaining the center of mass of a gyro wheel or rotor in axially fixed position with respect to the gyro case.

The mechanism of the invention is especially applicable to that type of gyroscope in which the wheel or rotor is mounted on a high speed air bearing. But if desired the mechanism may be equally well applied to gyroscopes in which the wheel or rotor is mounted upon a conventional anti-friction bearing of the ball or roller type. Although high speed air bearings are extensively used today for mounting a rapidly rotating gyro wheel upon a shaft, they have one inherent defect in that they do not have sufficient axial stiffness to prevent slight axial shifting of the gyro wheel upon its supporting shaft.

It is therefore the principal object of this invention to provide simple and efficient means for counteracting the aforesaid inherent defect in high speed air bearings and thereby maintain the center of mass of a gyro wheel in fixed axial position upon its supporting shaft.

In accordance with the present invention, I provide an electric pickup and one or more electro-magnets the energization of at least one of which is controlled by the pickup through a suitable amplifier. The pickup is mounted in fixed position adjacent the periphery of the gyro wheel, and an electro-magnet is mounted in fixed position to attract the gyro wheel axially along its supporting shaft. In one form of the invention, I employ two electro-magnets which are mounted in fixed positions upon the gyro shaft one on each side of the gyro wheel. Then if the gyro wheel shifts axially in one direction the pickup will effect the energization of the proper electro-magnet to attract the gyro wheel in the opposite direction. In this way the center of mass of the gyro wheel is maintained in mid position between the two electro-magnets. As a slight modification of this form of the invention I permanently energize one of the electro-magnets sufficiently for it to slightly bias the gyro wheel in one direction along its shaft. The energization of the other electro-magnet is then controlled by the pickup in such a manner as to counteract the biasing effect of the permanently energized magnet in such manner as to maintain the gyro wheel in mid position between the two magnets.

In another form of the invention, I provide the aforesaid pickup and two sets of electro-magnets each of which comprises a plurality of similar electro-magnets arranged in an annular row. One set of electro-magnets is mounted in fixed position axially of the gyro shaft adjacent one side of the gyro wheel and the other set of electro-magnets is mounted in fixed position axially of the gyro shaft adjacent the other side of the gyro wheel. The pickup can then control the energization of both sets of electro-magnets to maintain the gyro wheel centered; or I can permanently energize one set of magnets and control the energization of the other set of magnets by the pickup as previously described.

As a further modification of the invention I contemplate the use of a coiled compression spring to bias the gyro wheel in one direction and mechanical means controlled by the pickup to move the gyro wheel in the opposite direction against the bias of the spring.

Having stated the principal object of the invention other and more limited objects of the invention will be apparent from the following specification and the accompanying drawings forming a part thereof wherein:

Fig. 7 is a diagrammatic view showing the construction of the electric pickup and one way of energizing the electro-magnetic means as shown in Figs. 1 and 5;

Fig. 8 is a diagrammatic view showing another way of energizing the electro-magnetic means shown in Fig. 1;

Fig. 9 is a diagrammatic view showing one way of energizing the electro-magnetic means as shown in Fig. 3; and Fig. 10 is a detail view of a portion of the electric pickup showing the association of the variable capacitors thereof with the gyro wheel.

Figure 1:
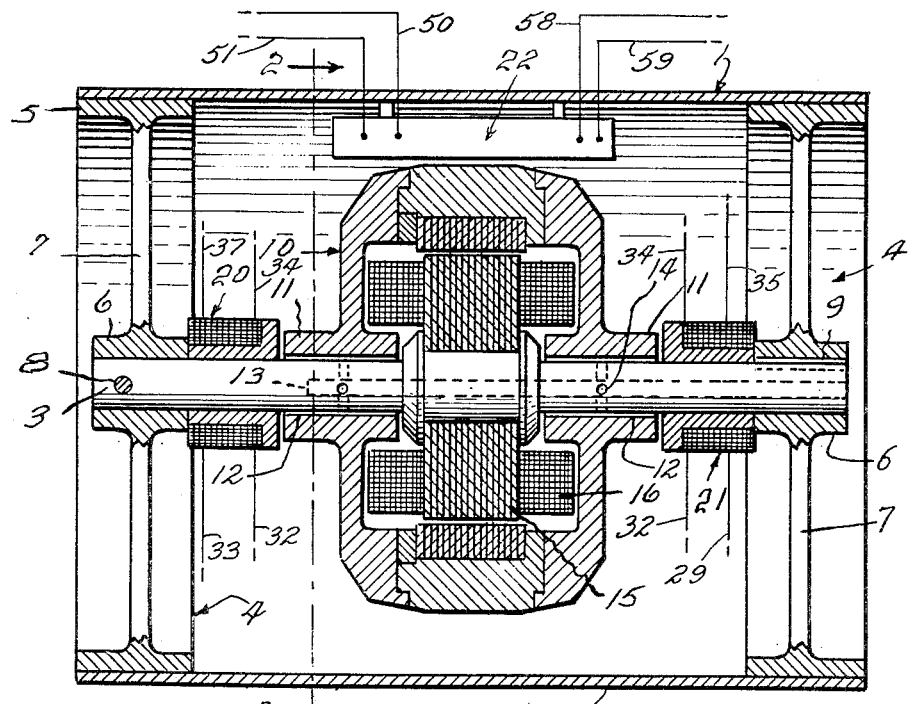
Fig. 1 is a central longitudinal section through a gyroscope constructed according to my invention, the plane of the section being indicated by the line 1—1 on Fig. 2.

Referring now to the drawings in detail by reference characters the numeral 1 indicates generally one form of a conventional gyroscope mechanism having my improved means for automatically maintaining the center of mass of the gyro wheel in fixed axial position. The gyroscope mechanism 1 comprises a tubular casing 2 in which a shaft 3 is non-rotatably mounted in fixed position, axially of the casing 1, by a pair of longitudinally spaced bearing brackets 4 secured within the casing 2. Each of the brackets 4 comprises an annular ring 5 and a centrally disposed hub 6 which is connected to the ring 5 by a plurality of radially extending spokes 7. The shaft 3 is held in fixed axial position by a pin 8 which extends through one of the hubs 6 and the shaft 3, and against rotation by a key 9 carried by the other hub 6.

A gyro wheel 10 having a pair of spaced oppositely extending axial hubs 11 is rotatably mounted upon the shaft 3 between the brackets 4. Conventional high speed air bearings are provided for the wheel 10 in the spaces 12 between the shaft 3 and the inner walls of the hubs 11. In the drawing these spaces 12 between the shaft 3 and the hubs 11 for the air bearing are greatly exaggerated for the sake of illustration. Compressed air is supplied to the spaces 12 for the air bearings through a longitudinal bore 13 in the shaft 3 and transverse bores 14 in the shaft 3 between the bore 13 and the spaces 12. The gyro wheel is adapted to be rotated at high speed by a conventional means which includes a laminated stator 15, having the usual windings 16, which is rigidly secured to the shaft 3 within the gyro wheel 10 between the opposing ends of the wheel hubs 11.

As previously stated high speed air bearings, although extensively used, have one inherent defect in that they do not have sufficient stiffness to prevent axial shifting of the gyro wheel 10 upon the shaft 3, and therefor require that some form of external stiffness control be provided.

Figure 2:
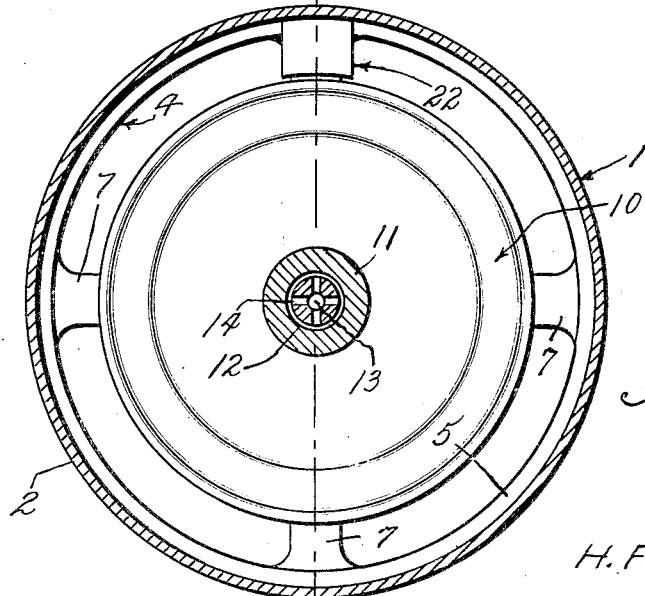
Fig. 2 is a transverse section taken substantially on the line 2—2 of Fig. 1.

The construction and operation of the various forms of such stiffness control shown herein will now be described, reference being had first to Figs. 1, 2 and 7 of the drawings, in which the presently preferred embodiment of my invention is illustrated. As shown therein the control mechanism for the gyro wheel comprises a pair of opposed oppositely acting similar electro-magnets 20 and 21 and an electric pickup 22. The electro-magnets 20 and 21 are secured in fixed position on the shaft 3, one adjacent each side of the gyro wheel 10; and the electric pickup 22 is secured in fixed position within the casing 2 adjacent the periphery of the gyro wheel 10. The electro-magnet 20 comprises the core or armature 23 and the windings 24 and 25 which are wound upon the core 23 in opposite directions; and the electro-magnet 21 comprises the core 26 and the windings 27 and 28 which are wound in opposite directions upon the core 26, the winding 24 of the electro-magnet 20 being similar in turns but opposite in direction to the winding 27 of the electro-magnet 21, and the winding 25 of the electro-magnet 20 being similar in turns but opposite in direction to the winding 28 of the electro-magnet 21. One end of the winding 28 is connected by a conductor 29 to a battery 30 which in turn is connected to a ground 31. The windings 28 and 25 are connected together in series with each other by a conductor 32 and to the ground 31 by a conductor 33. The windings 24 and 27 are connected together in series with each other by a conductor 34 and to the ground 31 by the conductors 35 and 33, and to an amplifier 36 by the conductor 37. The electro-magnets 20 and 21 are permanently energized in balanced oppositely acting relation to each other by the windings 25 and 28; and the windings 24 and 27 are adapted to be intermittently energized either positively or negatively, by the signal current from the amplifier 36 which current is always less than the current supplied to the windings 25 and 28 by the battery 30, as called for by the electric pickup 22 in accordance with the axial position of the gyro wheel 10 with respect to the pickup. The energization of the windings 24 and 27 either positively or negatively will cause an unbalancing of the electro-motive force exerted by the electro-magnets 20 and 21 with the result that the gyro wheel 10 will be attracted axially towards the electro-magnet having the greater capacity. For example, if the windings 24 and 27 are energized positively the capacity of the electro-magnet 20 will be increased and the capacity of the electro-magnet 21 proportionately decreased with the result that the gyro wheel 10 will be magnetically drawn axially toward the electro-magnet 20; and if the windings 24 and 27 are energized negatively the capacity of the electro-magnet 21 will be increased and the capacity of the electro-magnet 20 proportionately decreased whereby the gyro wheel 10 will be magnetically drawn axially in the opposite direction towards the electro-magnet 21.

The pickup 22 comprises the Wheatstone bridge 40, the transformer 41 and the amplifier 36. The Wheatstone bridge 40 comprises the arms 42, 43, 44 and 45. Fixed capacitors 46 and 47 are interposed in the arms 42 and 45 respectively, and variable capacitors 48 and 49 are interposed in the arms 43 and 44 respectively. The reference voltage is supplied to the Wheatstone bridge 40 through the conductors 50 and 51 which are respectively connected to the junction 52 of the arms 42 and 45, and to the junction 53 of the arms 43 and 44. The arms 43 and 44 are connected to a ground 54 through a fixed capacitor 55 by a conductor 56. The arms 42 and 43 are connected to one end of the primary winding 57 of the transformer 41 by a conductor 58, and the arms 44 and 45 are connected to the other end of the primary winding 57 by a conductor 59. The D. C. output of the secondary winding 60 of the transformer 41 is supplied to the amplifier 36 through a conductor 61, and the reference current is supplied to the amplifier 36 through a conductor 38.

The shifting of the gyro wheel axially in one direction or the other effects an unbalancing of the variable capacitors 48 and 49 which causes current to flow to the primary winding 57 of the transformer 41 through the conductor 58 and back through the conductor 59, or to the primary winding 57 through the conductor 59 and back through the conductor 58, depending on which direction the gyro wheel shifts. The D. C. output of the transformer 41 and consequently the D. C. output of the amplifier 36 is either plus (+) or minus (−) depending on the direction of flow of current to the transformer 41. The pickup 22 is sensitive to displacements of the gyro wheel within $10^{-6}$ inches; and the amplifier 36 and electro-magnets 20 and 21 are such as to provide sufficient biasing action to maintain the center of mass of the gyro wheel within $10^{-6}$ inches or better.

In Fig. 8 I have shown a slightly different manner of energizing the electro-magnets 20 and 21. As shown therein I omit the winding 27 on the core 26 of the electro-magnet 21 and supply either positive or negative signal current from the amplifier 36 through the conductor 37 only to the winding 24 on the core 23 of the electro-magnet 20, which either increases or decreases the capacity of the electro-magnet 20, without changing the capacity of the electro-magnet 21 which remains constant at all times. Otherwise the construction and operation of this form of the invention is identical with that shown and described in connection with Figs. 1, 2 and 7.

Figure 3:
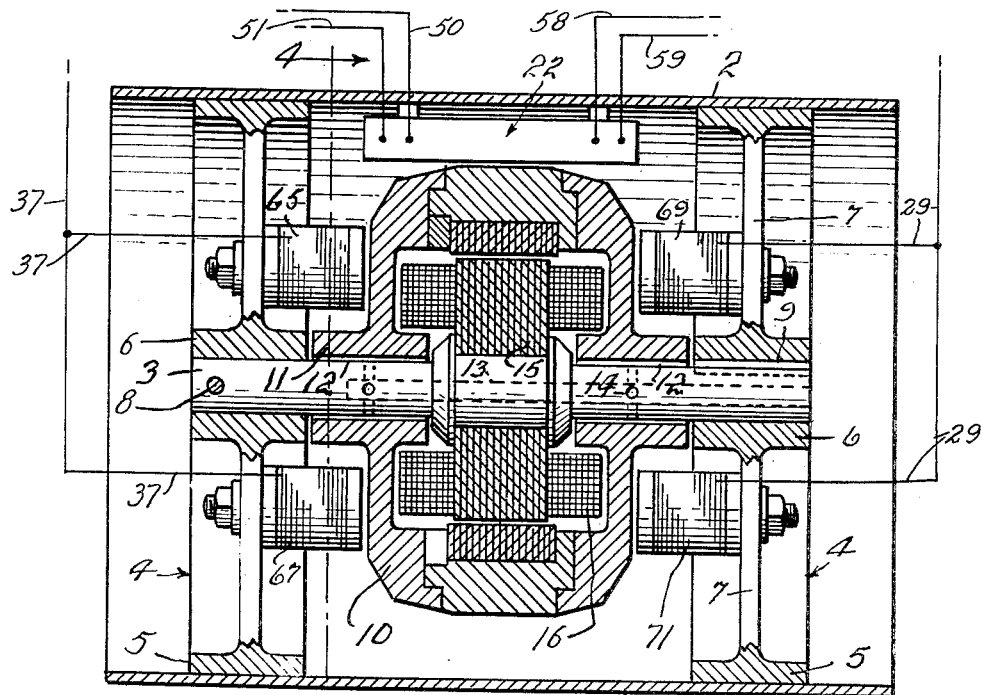
Fig. 3 is a view similar to Fig. 1 showing a modified form of the invention the plane of the section being indicated by the line 3—3 on Fig. 4.
Figure 4:
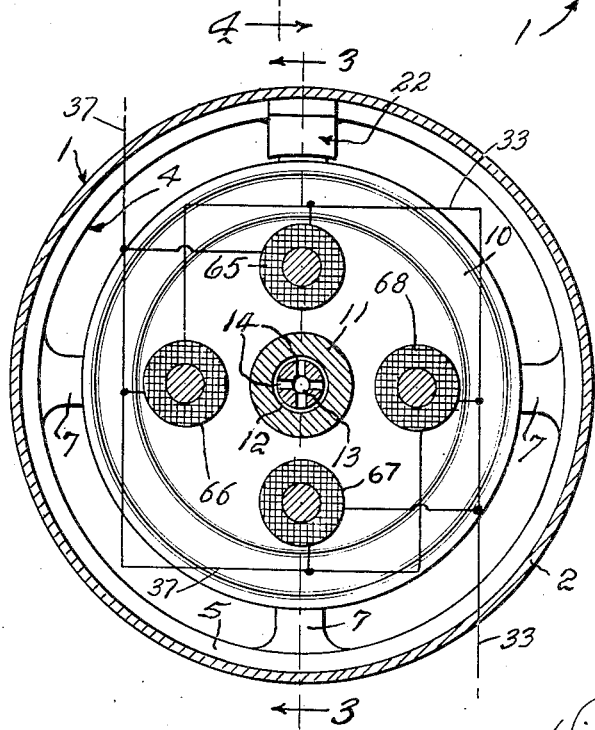
Fig. 4 is a transverse sectional view taken substantially on the line 4—4 of Fig. 3.

In Figs. 3, 4 and 9 I have shown another form of the invention in which I substitute a plurality of similar electro-magnets 65, 66, 67 and 68 for the electro-magnet 20, and a plurality of similar electro-magnets 69, 70, 71 and 72 for the electro-magnet 21. The electro-magnets 65, 66, 67 and 68 are arranged in an annular row about the shaft 3 on one side of the gyro wheel 10 and are secured in fixed position to the spokes 7 of the adjacent bearing bracket 4; and the electro-magnets 69, 70, 71 and 72 are arranged in an annular row about the shaft 3 on the opposite side of the gyro wheel 10 and are secured in fixed position to the spokes 7 of the adjacent bearing bracket 4. Each electro-magnet on one side of the gyro wheel 10 is paired with an electro-magnet on the opposite side of the gyro wheel 10, the magnet 65 being paired with the magnet 69, the magnet 66 being paired with the magnet 70, the magnet 67 being paired with the magnet 71, and the magnet 68 being paired with the magnet 72. Each pair of electro-magnets is wound in the same manner as the pair of electro-magnets 20 and 21, and the same reference characters as used in Fig. 7 are applied to the various similar windings, conductors, battery and ground shown in Fig. 9. The series windings 24 and 27 of each pair of electro-magnets shown in Fig. 9 are connected in parallel to the output conductor 37 of the amplifier 36 and to the ground 31; and the series windings 25 and 28 of each pair of electro-magnets shown in Fig. 9 are connected in parallel to the battery 30 and ground 31. The energization of the various pairs of electro-magnets of Fig. 9 is effected and controlled by the pickup 22 in the same manner as described in connection with Fig. 7. If desired each pair of magnets shown in Fig. 9 can be wound in the same manner as shown in Fig. 8 in which case the energization thereof will be effected and controlled by the pickup 22 in the same manner as described in connection with Fig. 8.

Figure 5:
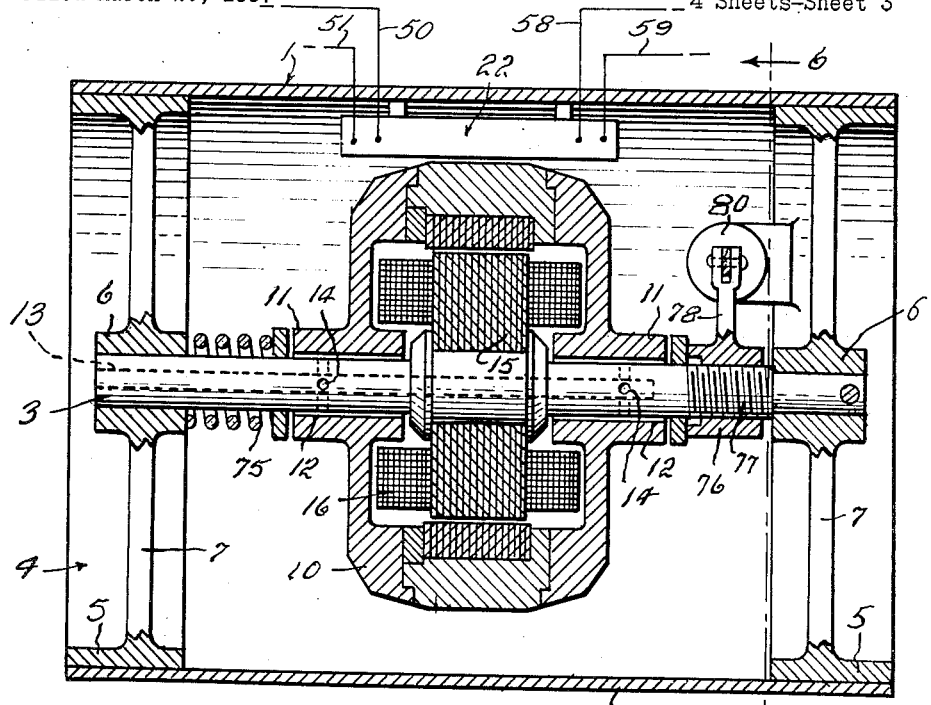
Fig. 5 is a view similar to Figs. 1 and 3 showing still another modification of the invention, the plane of the section being indicated by the line 5—5 on Fig. 6.
Figure 6:
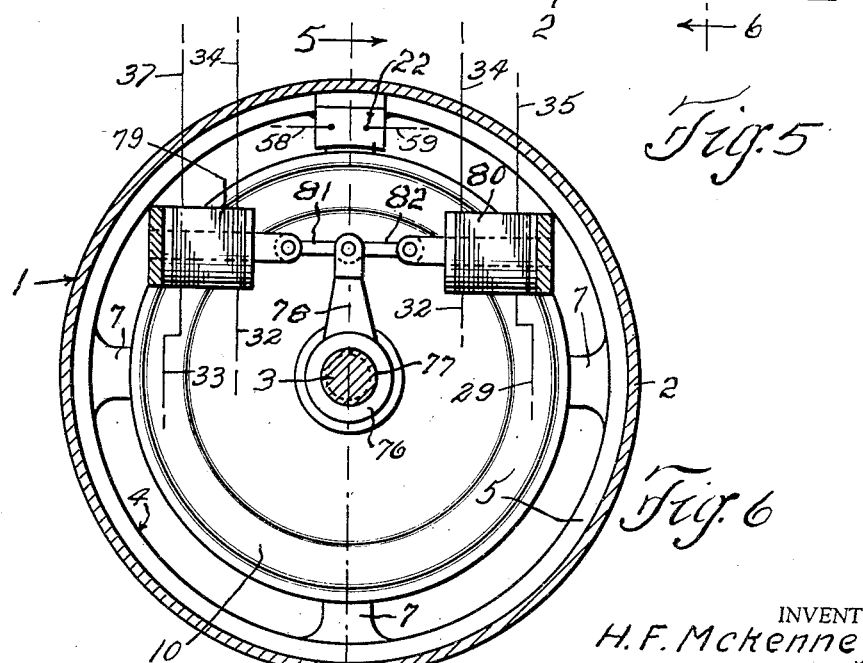
Fig. 6 is a transverse section taken substanitally on the line 6—6 of Fig. 5.

In Figs. 5 and 6 I have shown still another form of the invention. In this form of the invention I provide a coiled compression spring 75 by which the gyro wheel 10 is yieldingly biased axially in one direction on the shaft 3, and an internally threaded nut 76 which is screwed on to a threaded section 77 of the shaft 3 by which the gyro wheel 10 is positively shifted in the opposite direction on the shaft 3 against the bias of the spring 75. The nut 76 is provided with an upwardly extending arm 78 through which the nut 76 is rotated in one direction or the other by a pair of opposed oppositely acting solenoids 79 and 80 to and between which the upper end of the arm 78 is pivotally connected by links 81 and 82. The pair of solenoids 79 and 80 are wound, and the energization thereof controlled by the pickup 22, in the same manner as the pair of electro-magnets 20 and 21, as shown and described in connection with Fig. 7.

From the foregoing it will be apparent to those skilled in this art that I have provided very simple and efficient means for accomplishing the objects of the invention.

It is to be understood that I am not limited to the specific forms of the invention shown and described herein as various modifications may be made therein within the spirit of the invention and the scope of the appended claims.

I claim:

1. In a gyro mechanism having a casing, a shaft secured in fixed position in said casing, a gyro wheel rotatably mounted on said shaft for limited axial movement thereon, means for rotating said gyro wheel, means by which the center of mass of said gyro wheel is automatically maintained in fixed axial position on said shaft, said means comprising: means by which said wheel is biased axially in one direction on said shaft, electrically actuated means operative to counter-act the effect of said biasing means and move said gyro wheel in the opposite direction on said shaft, and an electric pickup secured to said casing in fixed position adjacent said gyro wheel by which the operation of said electrically actuated means is controlled.

2. In a gyro mechanism having a casing, a shaft secured in fixed position in said casing, a gyro wheel rotatably mounted on said shaft for limited axial movement thereon, means for rotating said gyro wheel, means by which the center of mass of said gyro wheel is automatically maintained in fixed axial position on said shaft, said means comprising: electro-magnetic means secured in fixed position adjacent one side of said gyro wheel and operative when energized to attract said gyro wheel axially in one direction on said shaft, other electro-magnetic means secured in fixed position adjacent the opposite side of said gyro wheel and operative when energized to attract said gyro wheel axially in the opposite direction on said shaft, and an electric pickup mounted in fixed position adjacent said gyro wheel by which the energization of said electro-magnetic means and said other electro-magnetic means are controlled in accordance with the axial position of said wheel with respect to said pickup.

3. In a gyro mechanism having a casing, a shaft secured in fixed position in said casing, a gyro wheel rotatably mounted on said shaft for limited axial movement thereon, means for rotating said gyro wheel, means by which the center of mass of said gyro wheel is automatically maintained in fixed axial position on said shaft, said means comprising: permanently energized electro-magnetic means secured in fixed position adjacent one side of said gyro wheel and operative to yieldingly bias said wheel axially in one direction on said shaft, other electro-magnetic means secured in fixed position adjacent the other side of said gyro wheel and operative when energized to counteract the biasing effect of said permanently energized electro-magnetic means and shift said gyro wheel in the opposite direction on said shaft, and an electric pickup mounted in fixed position adjacent said gyro wheel by which the energization of said other electro-magnetic means is controlled in accordance with the axial position of said gyro wheel on said shaft with respect to said pickup.

4. A gyro mechanism as defined in claim 3 in which said permanently energized means comprises an electro-magnet secured in fixed position on said shaft adjacent one side of said gyro wheel, and said other electro-magnetic means comprises an electro-magnet secured in fixed position on said shaft adjacent the opposite side of said gyro wheel.

5. A gyro mechanism as defined in claim 3 in which said permanently energized means comprises a plurality of electro-magnets arranged in an annular row about said shaft adjacent one side of said gyro wheel, and said other electro-magnetic means comprises a plurality of electro-magnets arranged in an annular row about said shaft adjacent the opposite side of said gyro wheel.

6. A gyro mechanism as defined in claim 2 in which said electro-magnetic means comprises an electro-magnet secured in fixed position on said shaft adjacent one side of said gyro wheel, and said other electro-magnetic means comprises an electro-magnet secured in fixed position on said shaft adjacent the opposite side of said gyro wheel.

7. A gyro mechanism as defined in claim 2 in which said electro-magnetic means comprises a plurality of electro-magnets arranged in an annular row about said shaft adjacent one side of said gyro wheel, and said other electro-magnetic means comprises a plurality of electro-magnets arranged in an annular row about said shaft adjacent the opposite side of said gyro wheel.

8. A gyro mechanism as defined in claim 1 in which the means by which said wheel is biased axially in one direction on said shaft comprises permanently energized electro-magnetic means secured in fixed position adjacent one side of said gyro wheel.

9. A gyro mechanism as defined in claim 8 in which said electrically actuated means comprises electro-magnetic means secured in fixed position adjacent the opposite side of said gyro wheel.

10. A gyro mechanism as defined in claim 1 in which said electrically actuated means comprises electro-magnetic means secured in fixed position adjacent one side of said gyro wheel.

11. A gyro mechanism as defined in claim 1 in which the means by which said wheel is biased axially in one direction on said shaft comprises a coiled compression spring mounted on said shaft adjacent one side of said gyro wheel between a fixed abutment and said gyro wheel.

12. A gyro mechanism as defined in claim 11 in which said electrically actuated means includes an internally threaded nut screwed onto a threaded section of said shaft adjacent the opposite side of said gyro wheel and means by which said nut is rotated towards and away from said gyro wheel.

13. In a gyro mechanism having a casing, a shaft secured in fixed position in said casing, a gyro wheel rotatably mounted on said shaft for limited axial movement thereon, means for rotating said gyro wheel, means by which the center of mass of said gyro wheel is automatically maintained in fixed axial position on said shaft, said means comprising: a pair of electro-magnetic means one of which is secured in fixed position adjacent one side of said gyro wheel and the other of which is secured in fixed position adjacent the other side of said gyro wheel, said electro-magnetic means being operative when energized to attract said gyro wheel in opposite directions on said shaft, means by which said electro-magnetic means are permanently energized in balanced relation with respect to each other, electronic means by which the electro-motive force exerted by one of said electro-magnetic means is decreased and the electro-motive force exerted by the other of said electro-magnetic means is proportionately decreased, said electronic means comprising an electric pickup mounted in fixed position adjacent said gyro wheel and operative to selectively increase the electro-motive force exerted by one of said electro-magnets and proportionately decrease the electro-motive force exerted by the other of said electro-magnets in accordance with the axial position of said gyro wheel on said shaft with respect to said pickup.

14. In a gyro mechanism having a casing, a shaft secured in fixed position in said casing, a gyro wheel rotatably mounted on said shaft for limited axial movement thereon, means for rotating said gyro wheel, means by which the center of mass of said gyro wheel is automatically maintained in fixed axial position on said shaft, said means comprising: a pair of electro-magnetic means one of which is secured in fixed position adjacent one side of said gyro wheel and the other of which is secured in fixed position adjacent the other side of said gyro wheel, said electro-magnetic means being operative when energized to attract said gyro wheel in opposite directions on said shaft, means by which said electro-magnetic means are permanently energized in balanced relation with respect to each other, electronic means by which the electro-motive force exerted by one of said electro-magnetic means is increased and decreased in accordance with the axial position of said gyro wheel on said shaft, said electronic means comprising an electric pickup secured in fixed position adjacent said gyro wheel.

15. A gyro mechanism as defined in claim 13 in which said pair of electro-magnetic means comprises a pair of similar electro-magnets one of which is secured in fixed position on said shaft between a fixed abutment and said gyro wheel adjacent one side of said gyro wheel and the other of which is secured in fixed position on said shaft between a fixed abutment and said gyro wheel adjacent the opposite side of said gyro wheel.

16. A gyro mechanism as defined in claim 15 in which said pair of electro-magnetic means comprises a plurality of electro-magnets secured in fixed position in annular row about said shaft adjacent one side of said gyro wheel and a plurality of electro-magnets secured in fixed position in an annular row about said shaft adjacent the opposite side of said gyro wheel.

17. In a gyro mechanism having a casing, a shaft secured in fixed position in said casing, a gyro wheel rotatably mounted on said shaft for limited axial movement thereon, means for rotating said gyro wheel, means by which the center of mass of said gyro wheel is automatically maintained in fixed axial position on said shaft, said means comprising: a pair of similar electro-magnets one of which is secured in fixed position on said shaft between a fixed abutment and said gyro wheel adjacent one side of said gyro wheel and the other of which is secured in fixed position on said shaft between a fixed abutment and said gyro wheel adjacent the opposite side of said gyro wheel, said electro-magnets being operative when energized to attract said gyro wheel in opposite directions on said shaft, means by which said electro-magnets are permanently energized in balanced relation with respect to each other, and electronic means by which the electro-motive force exerted by one of said electro-magnets is increased and decreased in accordance with the axial position of said gyro wheel on said shaft, said electronic means comprising an electric pickup secured in fixed position adjacent said gyro wheel.

No references cited.